Figures 1, 2:
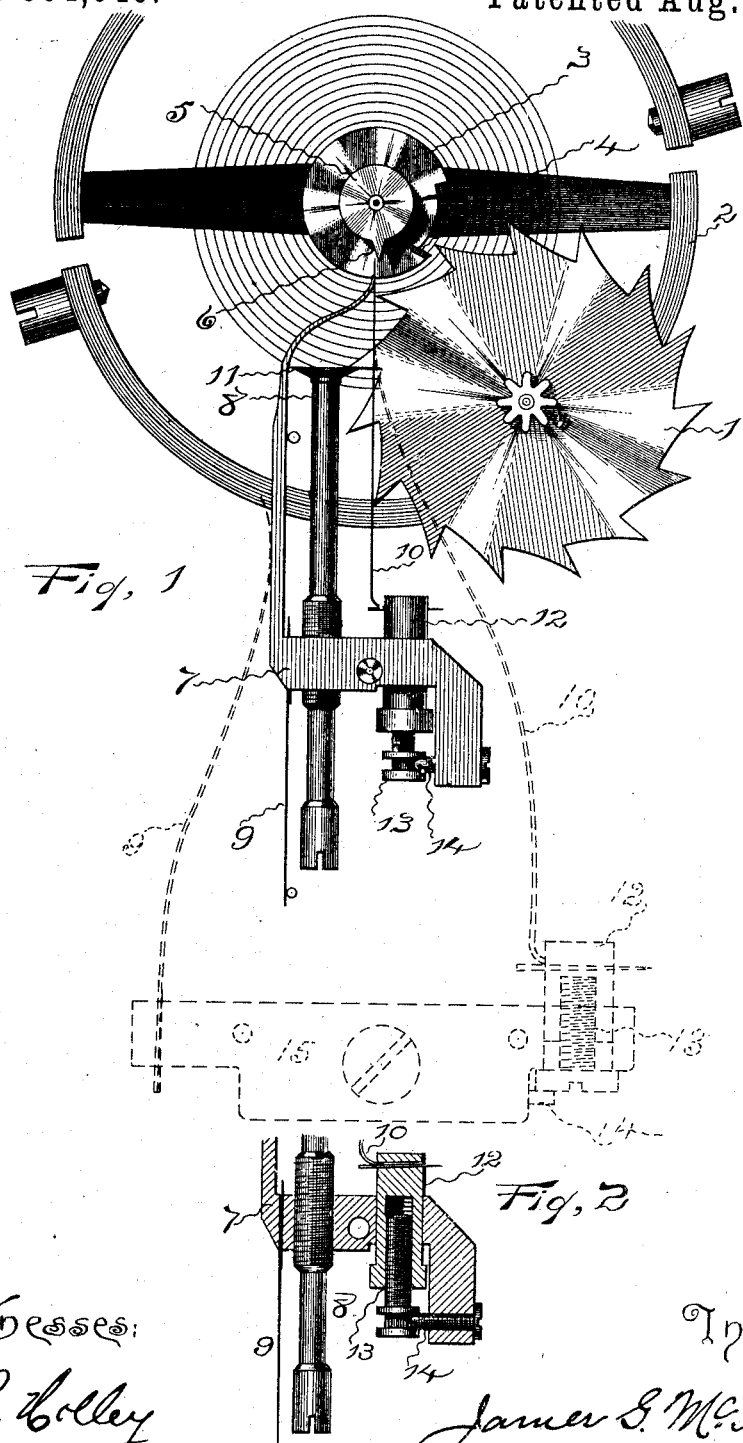

(No Model.)

J. G. McALPINE.
CHRONOMETER ESCAPEMENT.

No. 504,046. Patented Aug. 29, 1893.

Witnesses:
H. B. Holley
C. E. Buckland

Inventor
James G. McAlpine, by
Harry R. Williams,
Atty

UNITED STATES PATENT OFFICE.

JAMES G. McALPINE, OF HARTFORD, CONNECTICUT.

CHRONOMETER-ESCAPEMENT.

SPECIFICATION forming part of Letters Patent No. 504,046, dated August 29, 1893.

Application filed October 15, 1892. Serial No. 448,980. (No model.)

*To all whom it may concern:*

Be it known that I, JAMES G. MCALPINE, a citizen of the United States, residing at Hartford, in the county of Hartford and State of Connecticut, have invented certain new and useful Improvements in Escapements, of which the following is a full, clear, and exact specification.

The invention relates to the class of chronometer escapements, and the object is to provide a simple and cheap escapement having parts which may be readily manufactured by machinery to their final shape, and which when assembled are susceptible of regular and delicate adjustment by any one in order that the beat may be perfectly isochronous.

Referring to the accompanying drawings: Figure 1 is a view on greatly enlarged scale, representing in full lines one form of the invention, the dotted lines illustrating a modified arrangement of the springs; and Fig. 2 is a detail sectional view of a portion of the locking detent lever.

In the views 1 indicates a scape wheel of ordinary form and construction which is driven by the main spring of the time piece through the usual train that meshes with the pinion on the arbor of the scape wheel. The staff of the balance 2 which is oscillated by the usual hair spring, has an impulse roller 3 with an impulse pallet or jewel 4, and a discharge roller 5 with a discharge tooth or pallet 6. The locking lever 7 mounted to oscillate upon an arbor, has a finger that extends around near the tooth of the discharge roller, and also supports in the form shown in full lines in Fig. 1, a detent 8, locking spring 9, and discharge spring 10. The detent 8 is formed with a thread upon its body which turns in a threaded socket in the body of the lever so that its end, which is preferably provided with a disk of ruby 11, may be adjusted by any one to proper position with relation to the tooth of the scape wheel by simply rotating it with a screw driver. The locking spring 9 is usually formed of a straight piece of spring metal pinned into an opening in the body of the lever and banking against a stop pin secured to the plate of the time-piece near the end of the spring, and the discharge spring 10 whose forward end projects into the path of movement of the tooth 6 on the discharge roller, is pinned into a sleeve 12 that is movable in a socket in the body of the lever. In the form shown a screw 13 fits and turns in a threaded socket in the sleeve 12, which screw is held from longitudinal movement by means of a locking pin or screw 14 that projects from the end of the body of the lever against the head so that when the screw 13 is rotated the sleeve is moved in or out so as to adjust the point of the discharge spring with relation to the tooth on the discharge roller.

In the construction represented by the dotted outline, the locking spring 9 is secured to a part stationarily attached to a plate of the time-piece, and loosely rests against the edge of the locking lever; and if desired, the sleeve 12, which holds the discharge spring 10, may be secured to a stationary piece 15, the sleeve being made adjustable therein in a manner similar to that already described. The piece 15 may support both springs or they may be supported on separate pieces, according to convenience. As the balance oscillates under impulse imparted by the teeth of the scape wheel upon the pallet or the impulse roller, the tooth on the discharge roller, by contact with the end of the discharge spring, pushes the locking lever so that the locking detent is withdrawn from the scape tooth and the scape wheel is allowed to drop. As the balance returns the discharge tooth passes the discharge spring without moving the lever which has been thrust back by the locking spring, so as to catch and hold the next tooth of the scape wheel as it comes around. With this construction the discharge spring may be readily adjusted with great nicety by rotating its adjusting screw; while the locking detent may be also adjusted to its correct position so that the most perfect adjustment, which is absolutely essential in order that the beat may be correct, may be obtained by any one without specially fitting the parts, thus enabling the parts to be manufactured by machinery to their finished shape in quantities and assembled by different persons who can readily regulate them to obtain a perfect beat.

I claim as my invention—

1. In combination with the balance and scape wheels of a time piece, an oscillating locking lever bearing a locking detent, a discharge spring held by a longitudinally screw adjustable support, and a locking spring, substantially as specified.

2. In combination with the balance and scape wheels of a time piece, an oscillating locking lever bearing a longitudinally screw adjustable locking detent, a discharge spring and a locking spring, substantially as specified.

3. In combination with the balance and scape wheels of a time piece, an oscillating locking lever bearing a longitudinally screw adjustable detent, a discharge spring and a locking spring held by a longitudinally screw adjustable support, substantially as specified.

4. In combination with the balance and scape wheels of a time piece, an oscillating locking lever bearing a longitudinally screw adjustable locking detent having a circular head, a discharge spring held by a longitudinally screw adjustable support, and an adjustable locking spring, substantially as specified.

JAMES G. McALPINE.

Witnesses:
HARRY R. WILLIAMS,
H. B. HOLLEY.